US011361083B1

United States Patent
Cui et al.

(10) Patent No.: US 11,361,083 B1
(45) Date of Patent: Jun. 14, 2022

(54) METHOD AND APPARATUS FOR SECURING EMBEDDED DEVICE FIRMWARE

(71) Applicant: RED BALLOON SECURITY, INC., New York, NY (US)

(72) Inventors: Ang Cui, New York, NY (US); Salvatore J. Stolfo, New York, NY (US)

(73) Assignee: RED BALLOON SECURITY, INC., New York, NY (US)

( * ) Notice: Subject to any disclaimer, the term of this patent is extended or adjusted under 35 U.S.C. 154(b) by 0 days.

(21) Appl. No.: 16/846,931

(22) Filed: Apr. 13, 2020

Related U.S. Application Data

(62) Division of application No. 14/868,204, filed on Sep. 28, 2015, now Pat. No. 10,657,262.

(60) Provisional application No. 62/076,749, filed on Nov. 7, 2014, provisional application No. 62/056,555, filed on Sep. 28, 2014, provisional application No. 62/056,553, filed on Sep. 28, 2014.

(51) Int. Cl.
*G06F 21/57* (2013.01)
*G06F 8/65* (2018.01)
*G06F 21/54* (2013.01)

(52) U.S. Cl.
CPC .............. *G06F 21/577* (2013.01); *G06F 8/65* (2013.01); *G06F 21/54* (2013.01); *G06F 2221/033* (2013.01)

(58) Field of Classification Search
CPC .......... G06F 21/577; G06F 8/65; G06F 21/54; G06F 2221/033
See application file for complete search history.

(56) References Cited

U.S. PATENT DOCUMENTS 5,794,044 A * 8/1998 Yellin .................... G06F 9/449
                                                        717/139
5,949,248 A 9/1999 Lamacchia et al.
(Continued)

OTHER PUBLICATIONS

Amme et al—Intermediate Representations of Mobile Code, Apr. 3, 2007, pp. 1-27 (Year: 2007).*

(Continued)

*Primary Examiner* — Luu T Pham
*Assistant Examiner* — James J Wilcox
(74) *Attorney, Agent, or Firm* — Sheppard, Mullin, Richter & Hampton LLP

(57) ABSTRACT

Systems and methods for securing embedded devices via both online and offline defensive strategies. One or more security software components may be injected into firmware binary to create a modified firmware binary, which is functionally- and size-equivalent to the original firmware binary. The security software components may retrieve live forensic information related to embedded devices for use in live hardening of the modified firmware binary while the embedded device is online, dynamically patching the firmware. In addition, the live forensic information may be aggregated with other analytical data identifying firmware vulnerabilities. A vulnerability identification and mitigation system can then identify and inject modifications to the original firmware binary to develop secure firmware binary, which may be imaged and loaded onto one or more embedded devices within a network.

6 Claims, 8 Drawing Sheets

(56) References Cited

U.S. PATENT DOCUMENTS

| | | | |
|---|---|---|---|
| 5,983,348 A * | 11/1999 | Ji | G06F 21/51 714/38.1 |
| 6,052,278 A | 4/2000 | Tanzer et al. | |
| 6,052,778 A | 4/2000 | Hagy et al. | |
| 6,215,904 B1 * | 4/2001 | Lavallee | G06T 9/00 382/234 |
| 6,253,317 B1 | 6/2001 | Knapp, III et al. | |
| 6,272,641 B1 * | 8/2001 | Ji | G06F 21/51 380/252 |
| 6,668,325 B1 | 12/2003 | Collberg et al. | |
| 6,842,862 B2 * | 1/2005 | Chow | G06F 21/14 713/165 |
| 6,874,087 B1 | 3/2005 | Fetkovich et al. | |
| 6,922,773 B2 * | 7/2005 | Faraboschi | G06F 9/3016 712/221 |
| 7,386,839 B1 | 6/2008 | Golender et al. | |
| 7,596,721 B1 | 9/2009 | Flake et al. | |
| 7,774,596 B2 * | 8/2010 | Flynn | G06F 9/4406 713/161 |
| 7,996,671 B2 * | 8/2011 | Chheda | G06F 9/30156 713/164 |
| 8,087,067 B2 * | 12/2011 | Mahaffey | G06F 21/30 726/3 |
| 8,214,653 B1 | 7/2012 | Marr et al. | |
| 8,266,597 B2 | 9/2012 | Panchamukhi et al. | |
| 8,510,596 B1 | 8/2013 | Gupta et al. | |
| 8,601,170 B1 | 12/2013 | Marr et al. | |
| 8,793,795 B1 | 7/2014 | Ravi et al. | |
| 8,869,282 B1 | 10/2014 | Lazarowitz | |
| 8,875,298 B2 * | 10/2014 | Li | G06F 21/562 726/25 |
| 8,887,144 B1 | 11/2014 | Marr et al. | |
| 9,027,148 B2 * | 5/2015 | Thadikaran | G06F 13/14 726/26 |
| 9,092,296 B1 | 7/2015 | Nay et al. | |
| 9,148,413 B1 | 9/2015 | Marr et al. | |
| 9,177,122 B1 * | 11/2015 | Trier | G06F 8/65 |
| 9,317,682 B1 * | 4/2016 | Kopylov | G06F 21/577 |
| 9,609,020 B2 * | 3/2017 | White | G06F 21/51 |
| 9,826,017 B1 * | 11/2017 | Goldfeder | H04L 63/145 |
| 9,858,440 B1 * | 1/2018 | Wang | G06F 21/54 |
| 10,019,567 B1 * | 7/2018 | Allen | G06F 21/46 |
| 10,055,251 B1 | 8/2018 | Cui et al. | |
| 10,084,819 B1 * | 9/2018 | Nogin | H04L 63/20 |
| 10,089,463 B1 * | 10/2018 | Katz | G06F 21/645 |
| 10,177,934 B1 | 1/2019 | Marr et al. | |
| 10,657,262 B1 * | 5/2020 | Cui | G06F 21/577 |
| 2001/0037494 A1 | 11/2001 | Levien et al. | |
| 2002/0013938 A1 | 1/2002 | Duesterwald et al. | |
| 2002/0016918 A1 * | 2/2002 | Tucker | G06F 21/14 713/190 |
| 2002/0169979 A1 | 11/2002 | Zimmer | |
| 2002/0199172 A1 | 12/2002 | Bunnell | |
| 2003/0023856 A1 | 1/2003 | Horne et al. | |
| 2003/0115580 A1 | 6/2003 | Arai et al. | |
| 2003/0159063 A1 * | 8/2003 | Apfelbaum | G06F 21/577 726/25 |
| 2003/0188173 A1 | 10/2003 | Zimmer et al. | |
| 2003/0204374 A1 | 10/2003 | Madsen et al. | |
| 2004/0025027 A1 * | 2/2004 | Balard | G06F 21/31 713/183 |
| 2004/0064722 A1 | 4/2004 | Neelay et al. | |
| 2004/0073445 A1 | 4/2004 | Melllinger et al. | |
| 2004/0078589 A1 * | 4/2004 | Giraud | G06F 21/77 726/34 |
| 2004/0128260 A1 | 7/2004 | Amedure et al. | |
| 2004/0143828 A1 | 7/2004 | Liu et al. | |
| 2004/0168157 A1 | 8/2004 | Hundt et al. | |
| 2004/0193914 A1 * | 9/2004 | Chih-Wei | G06F 21/121 726/27 |
| 2004/0237068 A1 | 11/2004 | Ren | |
| 2005/0060522 A1 | 3/2005 | Correa | |
| 2005/0063242 A1 | 3/2005 | Ren | |
| 2005/0108562 A1 | 5/2005 | Khazan et al. | |
| 2005/0114639 A1 | 5/2005 | Zimmer | |
| 2005/0257054 A1 * | 11/2005 | Tucker | G06F 21/52 713/167 |
| 2005/0289511 A1 * | 12/2005 | Tucker | G06F 21/6209 717/110 |
| 2006/0005246 A1 * | 1/2006 | Dalton | G06F 21/577 726/25 |
| 2006/0075260 A1 * | 4/2006 | Tucker | G06F 21/6209 713/190 |
| 2006/0107268 A1 | 5/2006 | Chrableh | |
| 2006/0117388 A1 | 6/2006 | Nelson et al. | |
| 2006/0143600 A1 * | 6/2006 | Cottrell | G06F 21/572 717/168 |
| 2006/0161985 A1 | 7/2006 | Zhao | |
| 2006/0174226 A1 | 8/2006 | Fair et al. | |
| 2006/0277539 A1 | 12/2006 | Amarasinghe et al. | |
| 2007/0022428 A1 | 1/2007 | Yamasaki | |
| 2007/0055711 A1 | 3/2007 | Polyakov et al. | |
| 2007/0172053 A1 * | 7/2007 | Poirier | G06F 21/72 380/28 |
| 2007/0226717 A1 | 9/2007 | Shtilman et al. | |
| 2007/0240138 A1 * | 10/2007 | Chess | G06F 11/3612 717/143 |
| 2007/0274230 A1 | 11/2007 | Werber et al. | |
| 2008/0083030 A1 | 4/2008 | Durham et al. | |
| 2008/0184220 A1 | 7/2008 | Chen et al. | |
| 2008/0221833 A1 | 9/2008 | Brown et al. | |
| 2008/0291017 A1 | 11/2008 | Yermal et al. | |
| 2009/0183137 A1 * | 7/2009 | Ponnath | G06F 21/54 717/101 |
| 2009/0249368 A1 | 10/2009 | Needamangala et al. | |
| 2009/0288164 A1 | 11/2009 | Adelstein et al. | |
| 2009/0307536 A1 | 12/2009 | Stewart et al. | |
| 2009/0319798 A1 * | 12/2009 | Ooi | G06F 21/32 713/186 |
| 2009/0328232 A1 * | 12/2009 | Safford, III | G06F 21/54 726/26 |
| 2010/0011243 A1 | 1/2010 | Locasto et al. | |
| 2010/0083240 A1 * | 4/2010 | Siman | G06F 16/245 717/144 |
| 2010/0095376 A1 | 4/2010 | Rodriguez et al. | |
| 2010/0162240 A1 * | 6/2010 | Zhang | G06F 21/577 718/1 |
| 2010/0275173 A1 | 10/2010 | McDonald et al. | |
| 2010/0325704 A1 | 12/2010 | Etchegoyen | |
| 2010/0333079 A1 * | 12/2010 | Sverdlov | G06F 21/6218 717/168 |
| 2011/0055637 A1 | 3/2011 | Clemm et al. | |
| 2011/0131447 A1 | 6/2011 | Prakash et al. | |
| 2011/0154051 A1 * | 6/2011 | Larson | G06F 21/54 713/189 |
| 2011/0185345 A1 * | 7/2011 | Swamy | G06F 8/436 717/146 |
| 2011/0219452 A1 | 9/2011 | Porter | |
| 2011/0276837 A1 | 11/2011 | Potter et al. | |
| 2012/0005480 A1 | 1/2012 | Batke et al. | |
| 2012/0011219 A1 | 1/2012 | Zhang et al. | |
| 2012/0017262 A1 | 1/2012 | Kapoor et al. | |
| 2012/0191660 A1 | 7/2012 | Hoog | |
| 2012/0216183 A1 | 8/2012 | Mahajan et al. | |
| 2012/0304161 A1 * | 11/2012 | Ahadi | G06F 8/433 717/156 |
| 2013/0047143 A1 | 2/2013 | Chalmers et al. | |
| 2013/0111457 A1 | 5/2013 | Culter | |
| 2013/0167241 A1 * | 6/2013 | Siman | G06F 16/9024 726/25 |
| 2013/0205398 A1 * | 8/2013 | Kalman | G06F 21/10 726/25 |
| 2013/0205399 A1 * | 8/2013 | Kalman | G06F 21/10 726/25 |
| 2013/0347104 A1 | 12/2013 | Raber et al. | |
| 2014/0007073 A1 | 1/2014 | Cavalaris et al. | |
| 2014/0047428 A1 | 2/2014 | Prakash et al. | |
| 2014/0068594 A1 | 3/2014 | Young et al. | |
| 2014/0082373 A1 * | 3/2014 | Colnot | G06F 21/572 713/193 |
| 2014/0137257 A1 | 5/2014 | Martinez et al. | |

(56) References Cited

U.S. PATENT DOCUMENTS

| | | | |
|---|---|---|---|
| 2014/0215605 A1* | 7/2014 | Decime | H04L 63/1441 726/22 |
| 2014/0282853 A1* | 9/2014 | Velammal | G06F 21/54 726/1 |
| 2014/0283038 A1* | 9/2014 | Call | H04L 63/1441 726/22 |
| 2014/0283067 A1* | 9/2014 | Call | H04L 63/1466 726/23 |
| 2014/0283068 A1* | 9/2014 | Call | G06F 21/566 726/23 |
| 2014/0283069 A1* | 9/2014 | Call | H04L 63/1441 726/23 |
| 2014/0298474 A1* | 10/2014 | Kalman | G06F 21/577 726/25 |
| 2014/0325661 A1 | 10/2014 | Hoog | |
| 2015/0020198 A1 | 1/2015 | Mirski et al. | |
| 2015/0067314 A1* | 3/2015 | Strauss | G06F 21/572 713/2 |
| 2015/0067875 A1 | 3/2015 | Johnson et al. | |
| 2015/0199530 A1* | 7/2015 | Thanos | H04L 9/14 713/164 |
| 2015/0227745 A1* | 8/2015 | Bhattacharya | G06F 21/577 726/25 |
| 2015/0302202 A1* | 10/2015 | Yamamoto | G06F 21/54 726/25 |
| 2015/0324588 A1 | 11/2015 | Locke | |
| 2015/0326389 A1 | 11/2015 | Johnson et al. | |
| 2015/0371050 A1* | 12/2015 | Martini | G06F 21/83 726/26 |
| 2016/0021121 A1 | 1/2016 | Cui et al. | |
| 2016/0078240 A1 | 3/2016 | Kang et al. | |
| 2016/0299832 A1* | 10/2016 | Bogusz | G06F 11/3624 |
| 2017/0244759 A1* | 8/2017 | Attfield | H04L 9/0894 |

OTHER PUBLICATIONS

Shade et al "Implementing Secure Remote Firmware Updates," Embedded Systems Conference Silicon Valley, pp. 1-18 (Year: 2011).*

Zdancewic-Programming Languages for Information Security, A Dissertation Presented to the Faculty of the Graduate School of Cornell University in Partial Fullfillment of the Requirements for the Degree of Doctor of Philosophy, Aug. 2002, pp. 1-232 (Year: 2002).*

Cui et al., "Defending Embedded Systems with Software Symbiotes, In: Recent Advances in Intrusion Detection," Sep. 21, 2011, pp. 1-20.

Cui et al., "Defending Embedded Systems with Software Symbiotes," Sep. 21, 2011, pp. 1-20, ACM which provides the date of publication.

Jones, "Exploiting Embedded Devices," Oct. 14, 2012, pp. 1-38.

Jurgens, Jan, "Developing Secure Embedded Systems: Pitfalls and Howto Avoid Them," 29th International Conference on Software Engineering 2007, IEEE (2007).

Ravi et al., "Security in Embedded Systems: Design Challenges," ACM Transactions on Embedded Computing Systems, vol. 3, No. 3, Aug. 2004, pp. 461-491.

Serpanos et al., "Security Challenges in Embedded Systems," ACM Transactions on Embedded Computing Systems, vol. 12, No. 1s, Article 66, Mar. 2013.

Wang et al., "Anomalous Payload-based network Intrusion Detection," 2004, pp. 203-222.

* cited by examiner

METHOD AND APPARATUS FOR SECURING EMBEDDED DEVICE FIRMWARE

CROSS-REFERENCE TO RELATED APPLICATIONS

This application is a divisional of U.S. application Ser. No. 14/868,204, filed on Sep. 28, 2015, and claims the benefit of U.S. Provisional Application Nos. 62/056,553 and 62/056,555, filed Sep. 28, 2014, and 62/076,749, filed Nov. 7, 2014, all of which are incorporated herein by reference in their entirety.

TECHNICAL FIELD

The disclosed technology relates generally to security for embedded devices and, more particularly to systems and methods for automatic vulnerability detection and mitigation.

DESCRIPTION OF THE RELATED ART

As is well known, the security of computer program is a major problem world-wide. All manner of people, with different motives and objectives and a wide variety of skills, can snoop or eavesdrop on a computer or a computer network, can inspect computer programs on the computer, can download and exfiltrate programs and data, can steal assets and information, can destroy critical assets and information, and/or can modify information. Regardless of motive, objective and skill, we refer to all such people as attackers.

Attackers can gain access to a computer network with the use of spyware or rootkits. Such software can be easily installed on computer systems from physical or digital media (e.g., mail, downloads, etc.) and can provide these attackers with administrator or "root" access on a machine along with the capability of gathering sensitive data. Attackers can exploit vulnerabilities in computer systems to inject malicious code. Rootkits have the ability to conceal themselves and elude detection, especially when the rootkit is previously unknown, as is the case with zero-day attacks.

Our global communication infrastructures such as the Internet are also vulnerable to attack. Communication infrastructures are powered by large numbers of legacy embedded devices, such as routers, switches, voice over IP (VoIP) adapters, virtual private network (VPN) devices, and firewalls. Similarly, embedded devices can include special-purpose appliances, such as printers, wireless access points, Internet Protocol (IP) phones, SCADA control devices, home TV entertainment centers, and other similar appliances, that are now commonplace in the modem home and office. These devices are typically built with general purpose, real-time embedded operating systems using stock components and are capable of interacting with general-purpose computers. Many of these devices are designed and made so that at least some portion of the software embedded in these devices (i.e., the firmware) can be updated from a remote computer using a firmware update procedure.

BRIEF SUMMARY OF EMBODIMENTS

According to various embodiments of the disclosed technology, a method of embedded device vulnerability identification and mitigation is provided. The method comprises: injecting at least one security software component into a firmware binary to create a modified firmware binary; loading the modified firmware binary onto the embedded device; collecting a plurality of live forensic information related to the modified firmware binary via the at least one security software component; aggregating the plurality of live forensic information and static analysis data generated by one or more static analysis techniques; identifying one or more vulnerabilities within the modified firmware binary based on the aggregated live forensic information and static analysis data; determining one or more security modifications; and modifying the modified firmware binary utilizing the one or more security modifications to create a secure firmware binary; wherein the security software component designed to detect an unauthorized modification of at least one in-memory data item acted upon by one or more functions of the modified firmware binary.

According to various embodiments of the disclosed technology, a method for securing computer code that includes a plurality of operators and a plurality of operands is provided. The method includes identifying a first data access code in a computer code; identifying in the computer code one or more invocations of the first data access code; identifying one or more operands from the one or more invocations of the first data access code, the one or more operands comprising a first operand set; determining a second operand set within the first operand set, the second operand set comprising one or more operands identified from the one or more invocations and is associated with at least one other data access code different than the first data access code; forming a data encoder instance; forming a data decoder instance; injecting the data decoder instance into a data wrapper on the first data access code such that the data decoder instance is invoked prior to the first data access code during execution of the computer code; encoding the second operand set using the data encoder instance to create an encoded operand set; and replacing the second operand set of the computer code with the encoded operand set.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
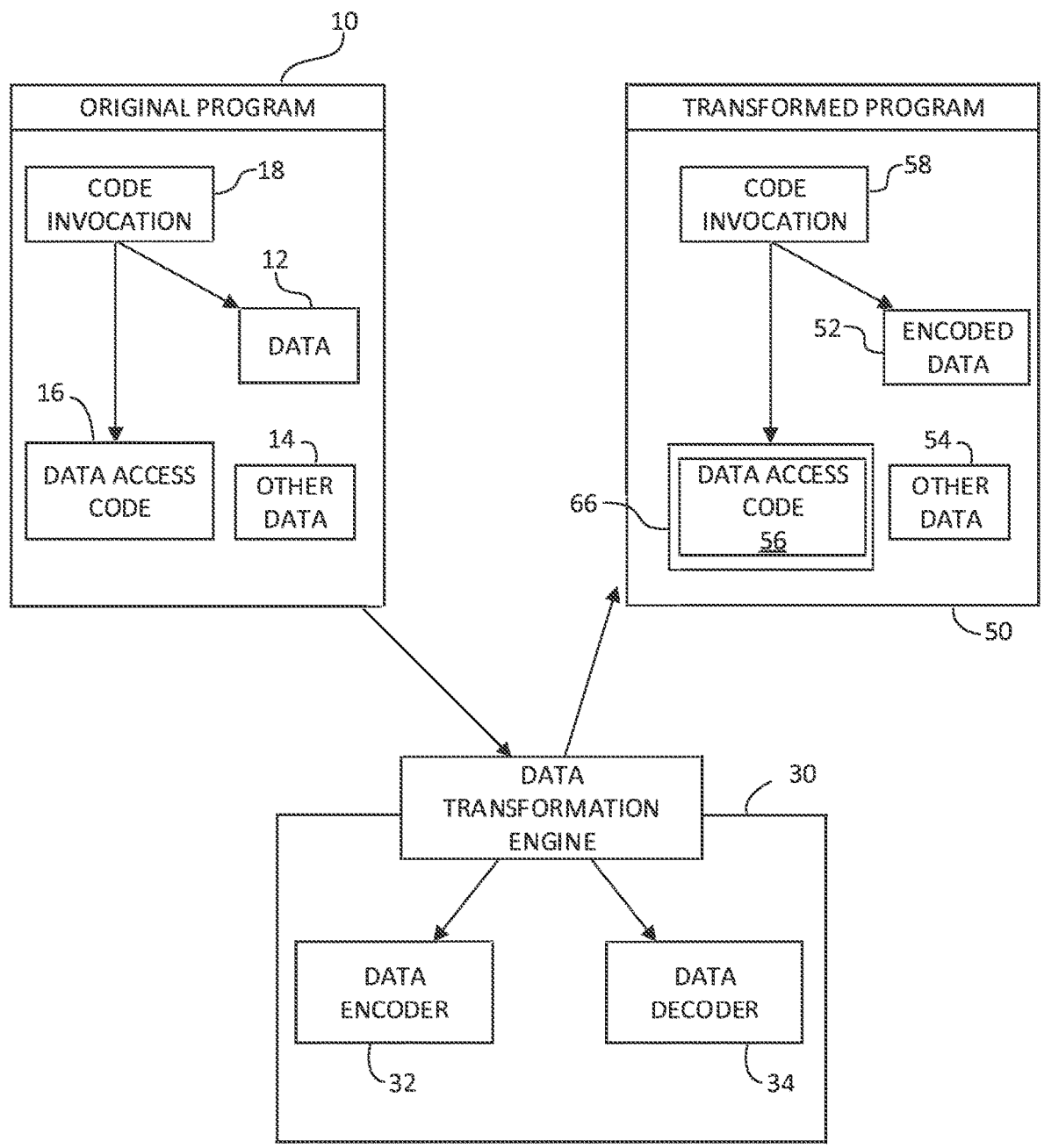
FIG. 1 is a block diagram of an example obfuscation operation of an embodiment of the technology of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

As discussed above, communication infrastructures are powered by large numbers of legacy embedded devices, such as routers, switches, voice over IP (VoIP) adapters, virtual private network (VPN) devices, and firewalls. SCADA control systems are embedded within the operation and management facilities that operate our nation's power grid and water supply. Routers are critical embedded devices implementing our modern telecommunications and banking systems. VoIP phone communication is critical in many business and personal activities. Printers are ubiquitous and critical in a variety of everyday tasks, as well as important business, government, and professional functions. Tablets are now pervasive business appliances, and even hard disk drives have embedded controllers in them. In all these cases, our critical business, government, and military network services are supported by large numbers of often forgotten special purpose embedded devices. It is remarkable that little to no defensive technologies, such as AV scanners or IDS's are available to protect these devices. Furthermore, a wide-area scan of IPv4 space has shown a vast number of embedded devices are trivially vulnerable to exploitation due to misconfigured management interfaces of these devices.

Furthermore, there is no "Patch Tuesday" infrastructure that can automatically update and harden these devices against attacks. When security vulnerabilities are detected for general purpose software, such as operating systems or browser software, patches may be pushed to devices to mitigate the vulnerabilities. For proprietary embedded systems, patches may not be capable of being pushed to embedded devices in the same manner, as many embedded systems require high uptimes compared to general purpose devices.

To identify and/or mitigate vulnerabilities, techniques and algorithms must provide support for all embedded devices generically. Most embedded devices, however, contained proprietary technologies, resulting in a "black box" built using heterogeneous software and hardware. To perform the necessary unpacking, analyzing, modifying, and repacking of the proprietary firmware of embedded devices is traditionally labor intensive. Although similar vulnerability identification and mitigation is possible in general purpose systems, the task is significantly more difficult on embedded systems, given the unique nature of embedded devices.

Embodiments of the technology disclosed herein are directed toward devices and methods for providing comprehensive and automated identification and mitigation of vulnerabilities present in embedded devices. More particularly, the various embodiments of the technology disclosed herein relate to preventing exploitation of vulnerabilities in firmware software and identifying the code of the attempted exploitation in devices such as printers, routers, VoIP phones, PLC's, RTU's, disk controllers, remote home management devices (eg., locking, monitoring, temperature control, etc.), network enabled appliances, automobiles, and many other special purpose devices.

Figure 6:
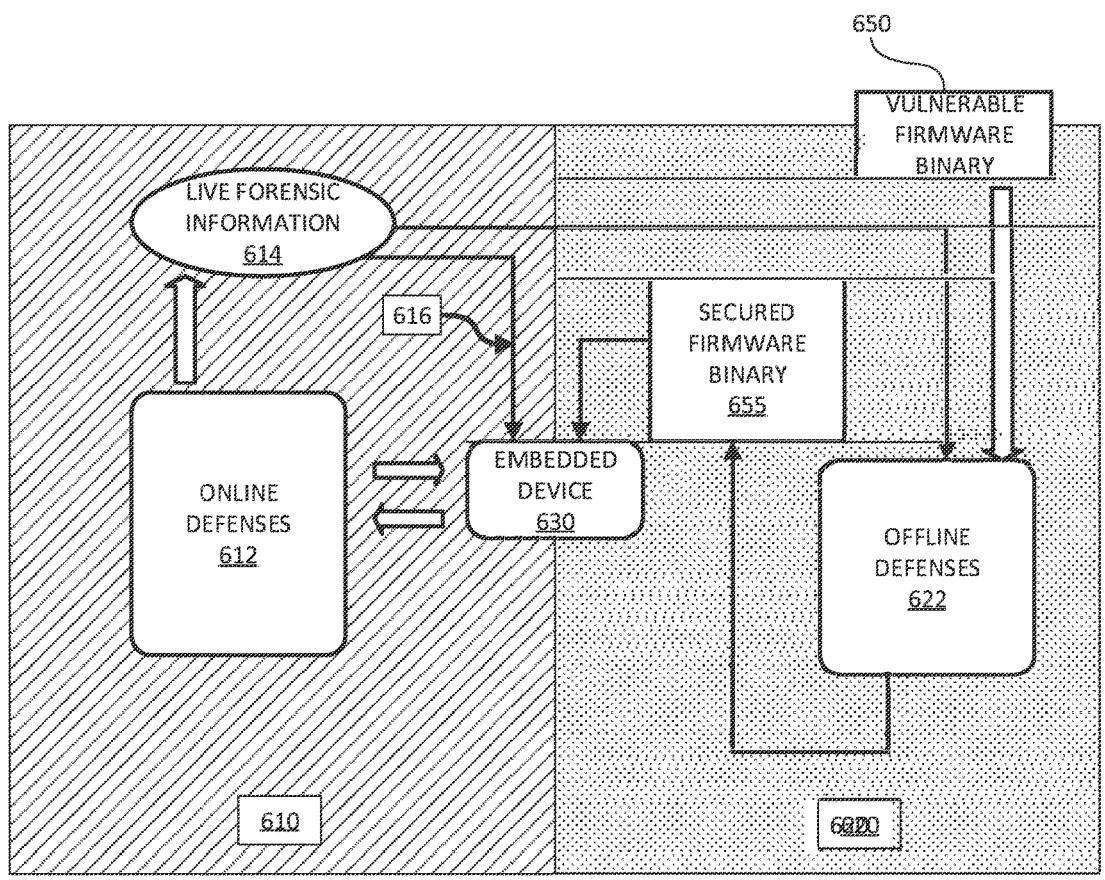
FIG. 6 is an example vulnerability identification and mitigation system in accordance with embodiments of the technology disclosed herein.

FIG. 6 is a data flow diagram illustrating an example vulnerability identification and mitigation system (VIMS) 600 in accordance with embodiments of the technology of the present disclosure. The VIMS 600 provides a novel framework for integrating all metadata collected through both static firmware vulnerability analysis and mitigation techniques and dynamic defensive techniques. In this way, the VIMS 600 is capable of continuous and automatic identification and mitigation of vulnerabilities on all protected devices. This enables network defenders to minimize reaction time between threat identification and mitigation deployment for proprietary embedded devices.

As illustrated in FIG. 6, the VIMS 600 operates on embedded devices in both an online state 610 and offline state 620. Devices not currently deployed are in an offline state 620, while devices that are actively used are in an online state 610. In each state 610, 620, vulnerability defenses are applied to the binary of the firmware image. Online defenses 612 include dynamic firmware defensive techniques. In various embodiments, the online defenses 612 may include security software components injected into the binary firmware of embedded devices. The security software components are injected into various injection points within the binary firmware during the firmware imaging process. In various embodiments, the security software components provide intrusion detection functionality when the embedded device 630 is in an online state 610, detecting unauthorized modification of the device firmware. Various embodiments of the security software components may also provide live forensic information 614, collecting information regarding the state of the embedded device 630 and gathering intelligence on attempts by malicious code and attackers to exploit vulnerabilities within the embedded device 630.

In various embodiments, the security software components scan the embedded device 630 to identify whether an unauthorized modification has been made. In various embodiments, the verification may be made at the level of a memory section. Other embodiments may conduct verification via scanning by the security software components at each address. In some embodiments, the verification may be made by scanning a page, which is typically 4 KB. For ease of discussion, the security software components will be discussed further with respect to scanning at the page-level. Although discussed with respect to an example embodiment, it would be apparent to a person of ordinary skill reading this disclosure that other levels of scanning the system are within the scope of the technology of the present disclosure.

Where page-level scanning is employed, upon detection of a modification the security software components may lock the page. By locking the page, the security software components may prevent subsequent modification attempts through exploitation of the same vulnerability. In various embodiments, the security software components may hook into the exception handling code of the operating system (OS) of the embedded device. Because the security software components are focused on the firmware binary of embedded devices, the security software components are OS- and hardware-agnostic, meaning the technology of the present disclosure is applicable regardless of the platform in which the embedded device is disposed. By utilizing the exception handling code, the security software components may identify the address of the particular modification, as well as the direct cause of the change. In various embodiments, the security software components may obtain the CPU state at the time of the modification. In some cases, the vulnerability may not reside at the site of the change, but instead further up the stack. In some embodiments, the security software components may dynamically hook each jump up the stack, continually exfiltrating data regarding the location of the modification and the change that occurred.

The live forensic information 614 is utilized both while the embedded device 630 is in an online state 610 and an offline state 620. During the online state 610, the online defenses 612 may include a dynamic mitigation component (not pictured) designed to analyze live forensic information 614 from the embedded device 630 and identify mitigation strategies to address identified vulnerabilities. This information may be used to conduct live hardening 616 of the firmware of the embedded device 630. Hardening is a security technique whereby binary code for unnecessary or unused functionality is removed or moved, reducing the surface of vulnerability of the firmware. By limiting the firmware code to only those software functions that are used based on a given configuration for the embedded device 630, the number of attack vectors which an attacker may use to attack the embedded device 630 is reduced, making the firmware more secure.

The live forensic information 614 may be utilized during the offline state 620 as well by the offline defenses 622. The offline defenses 622 take as inputs a physical embedded device and a corresponding vulnerable firmware binary 650. The offline defenses 622 aggregates several static analytical techniques and dynamically generated information (e.g., live forensic information 614) to inject modifications of the vulnerable firmware binary 650 to create secure firmware binary 655, which is used as the firmware image of the embedded device 630. The modifications are designed to address and mitigate vulnerabilities identified based on the aggregated information. Although modified, the resulting secure firmware binary 655 is a functionally equivalent firmware image as the vulnerable firmware binary 650. In various embodiments, the injected modifications may include the security software components enabling the online defenses 612 discussed above. In various embodiments, the live forensic information may include one or more of: memory contents; system resource utilization; location of firmware code being exploited; process stack and heap contents; network usage information; and behavior-based model of system behavior. This listing should not be interpreted as limiting the types of live forensic information 614 that may be utilized. A person of ordinary skill in the art reading the present disclosure will appreciate that the embodiments of the technology disclosed herein may utilize any type of live forensic information 614 that is retrievable by the security software component.

Various embodiments of the VIMS 600 may be implemented within a network of several embedded devices. In such embodiments, the offline defenses 622 may transmit generated modification to address vulnerabilities identified based on live forensic information 614 obtained from one or more embedded devices within the network to the other embedded devices. In this manner, the offline defenses 622 may ensure secure firmware binary 655 is generated for each embedded device within the network to address identified vulnerabilities.

Figure 7:
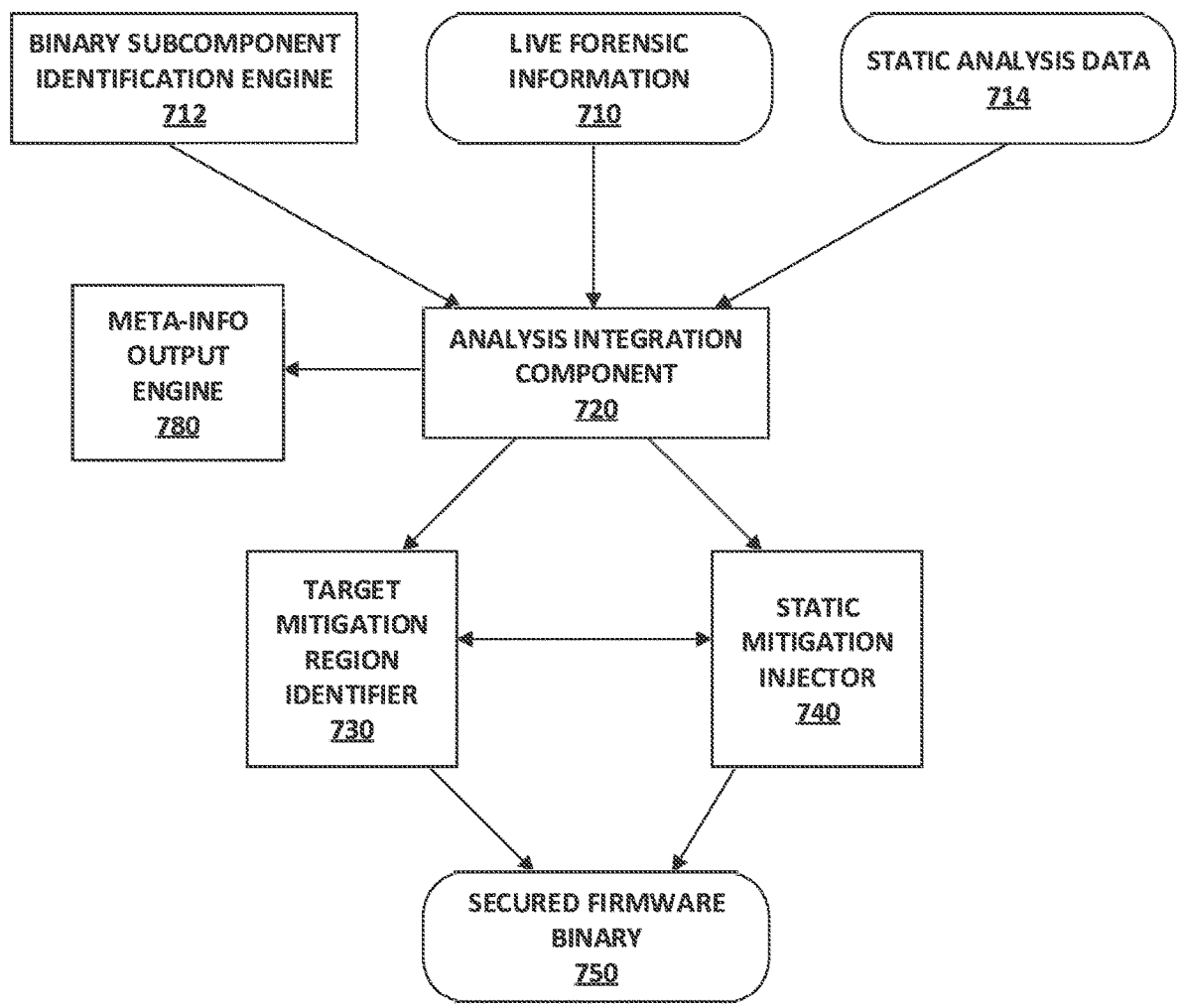
FIG. 7 is an example architecture of offline defenses in accordance with embodiments of the technology disclosed herein.

FIG. 7 is an example architecture of the offline defenses 700 in accordance with embodiments of the disclosed technology. The offline defenses 700 include a binary subcomponent identification engine 712. As discussed above, many embedded devices are "black box" proprietary devices. Although proprietary, many embedded devices still implement non-proprietary open source libraries, such as zlib and libSSL libraries, which inject vulnerability into the black box devices. The binary subcomponent identification engine 712 is designed to scan the firmware binary to identify the binary subcomponents making up the firmware binary, such as the use of vulnerable open source libraries.

In various embodiments, the binary subcomponent identification engine 712 outputs a listing of the different subcomponents comprising the firmware binary associated with an embedded device. This information may be aggregated with additional analytical data by an analysis integration component 720 of the offline defenses 700. By aggregating different sources of information regarding the firmware, embodiments of the technology disclosed herein can identify a larger number of vulnerabilities. In addition to the output of the binary subcomponent integration engine 712, various embodiments of the offline defenses 700 may obtain live forensic information 710 obtained from one or more security software components injected within the firmware binary. The live forensic information 710 may be similar to the live forensic information 614 discussed above with respect to FIG. 6. In some embodiments, the analysis integration component 720 may also obtain static analysis data 714. Non-limiting examples of static analysis tools for producing static analysis data 714 include: recursive descent binary code disassembly; control-flow and data-flow graph extraction; symbolic execution of disassembled code; and pattern matching of known software components. Based on the aggregated information, the analysis integration component 720 identifies areas of vulnerability within the firmware binary.

The analysis integration component 720 may also output the aggregated information and the identified vulnerabilities to a meta-info output engine 780. In various embodiments, the meta-info output engine 780 may identify certain metadata associated with the aggregated information and identified vulnerabilities. In various embodiments, the metadata outputted by the meta-info output engine 780 may be stored in a database associated with the embedded devices within a network, enabling other embedded devices to identify similar vulnerabilities easier. In some embodiments, the meta-info output engine 780 may provide the identified metadata back to the common analysis integration framework 720 so that information from past analysis may be utilized in creating a more efficient analysis.

The offline defenses 700 further include a target mitigation region identifier engine 730 and a static mitigation injector engine 740. The target mitigation region identifier engine 730 identifies areas within the firmware binary to modify in order to address vulnerabilities identified by the analysis integration component 720. Such mapping takes into account the unique constraints associated with embedded firmware modification. For example, the firmware content to be modified may need to be mapped to in-memory vulnerable attack surfaces (e.g., data). As virtual memory does not map directly to physical addresses, proper mapping by the target mitigation region identifier engine 730 is necessary to ensure that the right portion of the firmware binary is modified.

In various embodiments, modifications to the firmware binary are made in situ. In this way, the outputted secure firmware binary may be the same size as the original firmware binary. Accordingly, the target mitigation region identifier engine 730 may be configured to identify available space within the firmware binary to include the modification. In some embodiments, the target mitigation region identifier engine 730 may identify non-contiguous sections of the firmware binary capable of fitting one or more modifications. The target mitigation region identifier 730 may take into account the CPU architecture of a target embedded device, identified vulnerabilities identified by the analysis integration component 720, and the original firmware binary to determine a secure firmware binary layout resulting in a functionally- and size-equivalent secure firmware binary compared to the original firmware binary.

The static mitigation injector engine 740 generates and executes a set of modification operations to mitigate each identified vulnerability instance. The static target mitigation injector 740 utilizes the identified mapping from the target mitigation region identifier engine 730 to generate the modification operations. The static mitigation injector engine 740 may execute several mitigation techniques. In some embodiments, the static mitigation injector engine 740 may employ firmware autotomy, where the static mitigation injector engine 740 removes or deactivates the identified vulnerable firmware binary component. The static mitigation injector engine 740 may analyze the control flow of the firmware binary to ensure that removal or deactivation of the vulnerable firmware binary component will not cause unexpected actions, such as a system crash for example.

Autotomic binary structure randomization (ABSR) is another modification technique that the static mitigation injector engine 740 may employ in some embodiments. ABSR combines firmware autotomy and binary structure randomization. Binary structure randomization is automated randomization of executable binary through a series of functionality-preserving transforms that alters the binary layout of the executable binary at the sub-basis-block granularity and above. In various embodiments, the static mitigation injector engine 740 may employ ABSR to alter the binary layout of the target code region at the sub-basis-block level.

In various embodiments, the static mitigation injector engine 740 may employ software subcomponent replacement, whereby identified vulnerable firmware binary is replaced by functionally-equivalent, non-vulnerable binary. In various embodiments, the replaced binary may comprise a patched version of a vulnerable firmware library.

As discussed above with respect to FIG. 6, security software components may be inserted or injected into the firmware binary to enable dynamic analysis while an embedded device is in an online state. In various embodiments, the static mitigation injector engine 740 can insert one or more security software components to monitor and capture information related to attempted exploitation events, like the live forensic information 710 discussed above. By inserting security software components designed to capture such information, network administrators can obtain intelligence of real-world methods of exploitation and malicious components used by an attacker, enabling quicker response time to identified vulnerabilities. The security software components and example embodiments of online vulnerability detection and mitigation will be discussed in greater detail with respect to FIG. 8.

Due to the nature of firmware for embedded devices, attackers may analyze firmware images to identify vulnerable code. By learning where certain code strings are located in memory, attackers can utilize the located strings as "guide posts" to find more vulnerable code within the working memory to exploit. By obfuscating the code strings and other data within working memory, attackers are unable to locate the code necessary to identify and exploit additional vulnerabilities.

FIG. 1 is a block diagram of an example obfuscation operation of an embodiment of the technology of the present disclosure. The example obfuscation operation may be employed by the static mitigation injector engine 740 discussed with respect to FIG. 7 to limit attackers ability to analyze firmware images.

FIG. 1 depicts an original program 10, a transformed program 50, and a data transformation engine 30 that operates on original program 10 to transform it into transformed program 50. The original program includes at least a first data 12, a second data 14, a data access code 16 and a code invocation 18. The first data 12 is data that is operated on by data access code 16. Data access code 16 may also be referred to as an operand or an argument. The data access code 16 is any computer code that accesses data. Examples of such codes are functions or operators. The second data 14 is other data in program 10 that is not operated on by data access code 16 although it may be operated on by some other data access code (not shown). Code invocation 18 is a portion of program 10 that invokes data access code 16 during execution of program 10.

While FIG. 1 depicts only single instances of first data 12, second data 14, data access code 16 and code invocation 18, this is only illustrative. It will be understood that program 10 may include, and typically does include, many different data access codes, many different invocations of data access code, and many different first and second data.

Figure 3B:
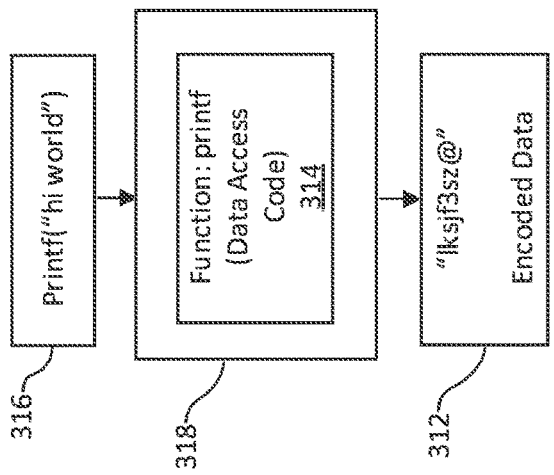
FIG. 3B illustrates an example encoded program in accordance with embodiments of the technology disclosed herein.
Figure 3A:
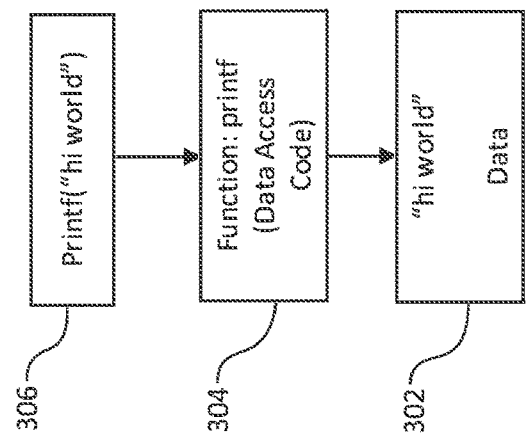
FIG. 3A illustrates an example original program in accordance with embodiments of the technology disclosed herein.

An illustrative example of program 10 is set forth in FIG. 3A. The example program 10 is a program for printing the phrase "hi world." The data 302 in this program is the phrase, "hi world." The data access code 304 is the function or operator "printf." The code invocation 306 is a portion of computer code containing the phrase "printf("hi world")". Examples of other data would be data not used in the printf operation.

For convenience and ready understanding, the example of FIG. 3A is set forth using as a data access code 304 the print function printf from one of the higher-level programming languages, the C programming language. It will be understood that printf is only illustrative of many, many data access codes that may be used in various embodiments of the technology of the present disclosure, that the programming language C is only illustrative of many, many programming languages that may be used, and that embodiments of the technology may be practiced with vastly more complicated computer programs. It will also be recognized that while the example of FIG. 3 illustrates source code, embodiments of the technology of the present disclosure may also be practiced on binary code such as that found in most firmware.

As illustrated in FIG. 1, transformation engine 30 comprises a data encoder 32 and a data decoder 34. The data encoder 32 has the property that it converts original data into encoded data, and the data decoder 34 has the property that it converts encoded data back into original data. Moreover, the data encoder 32 and the data decoder 34 have the property that operation of the data decoder 34 on the encoded data produced by operation of the data encoder 32 will produce the original data on which the data encoder 32 first operated. Data encoder 32 operates on data 12 to produce encoded data 52. Any type of data encoding technique may be applicable to embodiments of the technology disclosed herein. For example, the encoding may be done using enciphering algorithms, compression algorithms, combinations of enciphering and compression algorithms, and/or data relocation algorithms that relocate the data to different areas of the memory in which the data is stored. Enciphering algorithms, compression algorithms and data relocation algorithms are well known to those skilled in the art. Further details of the data transformation engine are set forth below in conjunction with FIG. 2.

Transformed program 50 comprises first encoded data 52, second data 54, data access code 56, code invocation 58, and a data decode wrapper 66. First encoded data 52 is data that was encoded by data encoder 32 and is operated on by the data access code 56. The data access code 56 is the same data access code as data access code 16 of original program 10. The data decode wrapper 66 is a function that transforms the argument of the data access code 56. In particular, wrapper 66 decodes the encoded data 52 on which the data access code 56 operates. The other data 54 is the same as data 18 of the original program 10.

Again, while FIG. 1 depicts only single instances of encoded data 52, second data 54, data access code 56, and code invocation 58, this is only illustrative. It will be understood that the transformed program may include, and typically does include, many different data access codes, many different invocations of data access codes, and many different first and second data. At least one of the data access codes will include a data decode wrapper 66.

FIG. 3B depicts an illustrative encoded program for printing the phrase "hi world." The encoded data 312 in the program is the data lksjf3sz@. The data access code 314 is the function or operator "printf." The code invocation 316 is the block of computer code "printf("lksjf3sz@")". The data access code is wrapped by data decode wrapper 318. As will be apparent, the encoded program conceals the original data representing the phrase "hi world."

Figure 4:
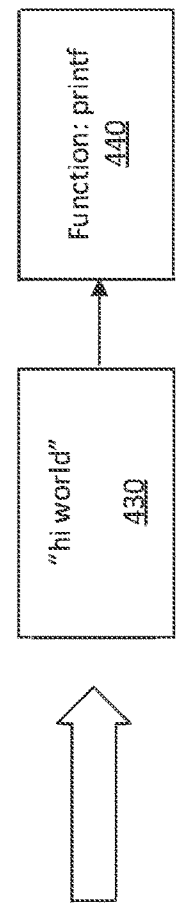
FIG. 4 is an example execution of an encoded program in accordance with embodiments of the technology disclosed herein.

FIG. 4 depicts an illustrative example of what happens when the transformed program is executed. The data decode wrapper 420 transforms the encoded data 410 "lksjf3sz@" into the original data 430 "hi world" and the data access code 440 "printf" operates on the original data 430 to print the phrase "hi world." Thus, execution of the transformed program still produces the same output as execution of the original program.

Figure 2:
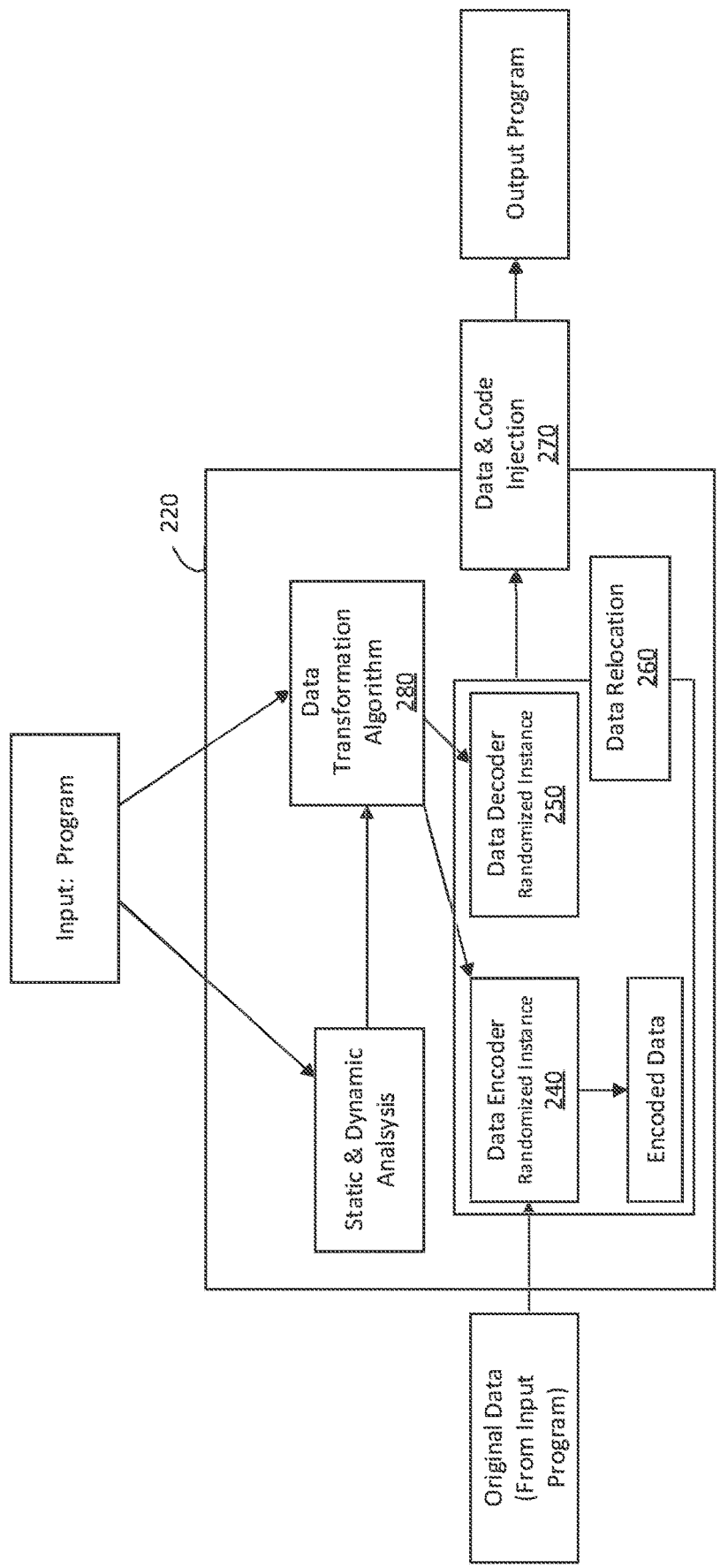
FIG. 2 illustrates an example data transformation engine 200 in accordance with embodiments of the technology disclosed herein.

FIG. 2 illustrates an example data transformation engine 200 in accordance with embodiments of the technology disclosed herein. As shown in FIG. 2, data transformation engine 200 comprises components for performing static and dynamic analysis of the program, a data transformation component 220, a data encoder component 240, a data decoder component 250, an optional data relocation component 260, and a data and code injection component 270. Each of the components of data transformation engine 200 is a segment of computer software code stored in a non-transitory medium in a computer system such as that depicted in FIG. 9. The component for performing static analysis of the computer program performs such a function as monitoring the program to make certain that it is not changed by unauthorized parties. The component for performing dynamic analysis of the program performs such a function as monitoring how long the program takes to perform certain tasks. The data transformation component 220 performs the operations depicted in FIG. 1 and described in more detail in FIG. 5, and components 240, 250, 260, and 270 perform the data encoding, data decoding, data relocation and data injection steps set forth in FIG. 5.

The data transformation algorithm 200 may utilize any reversible (i.e., symmetric) transform to convert an inputted program from one format into another. Non-limiting examples of reversible transforms include: encryption; compression; or stenographic transforms.

Figure 5:
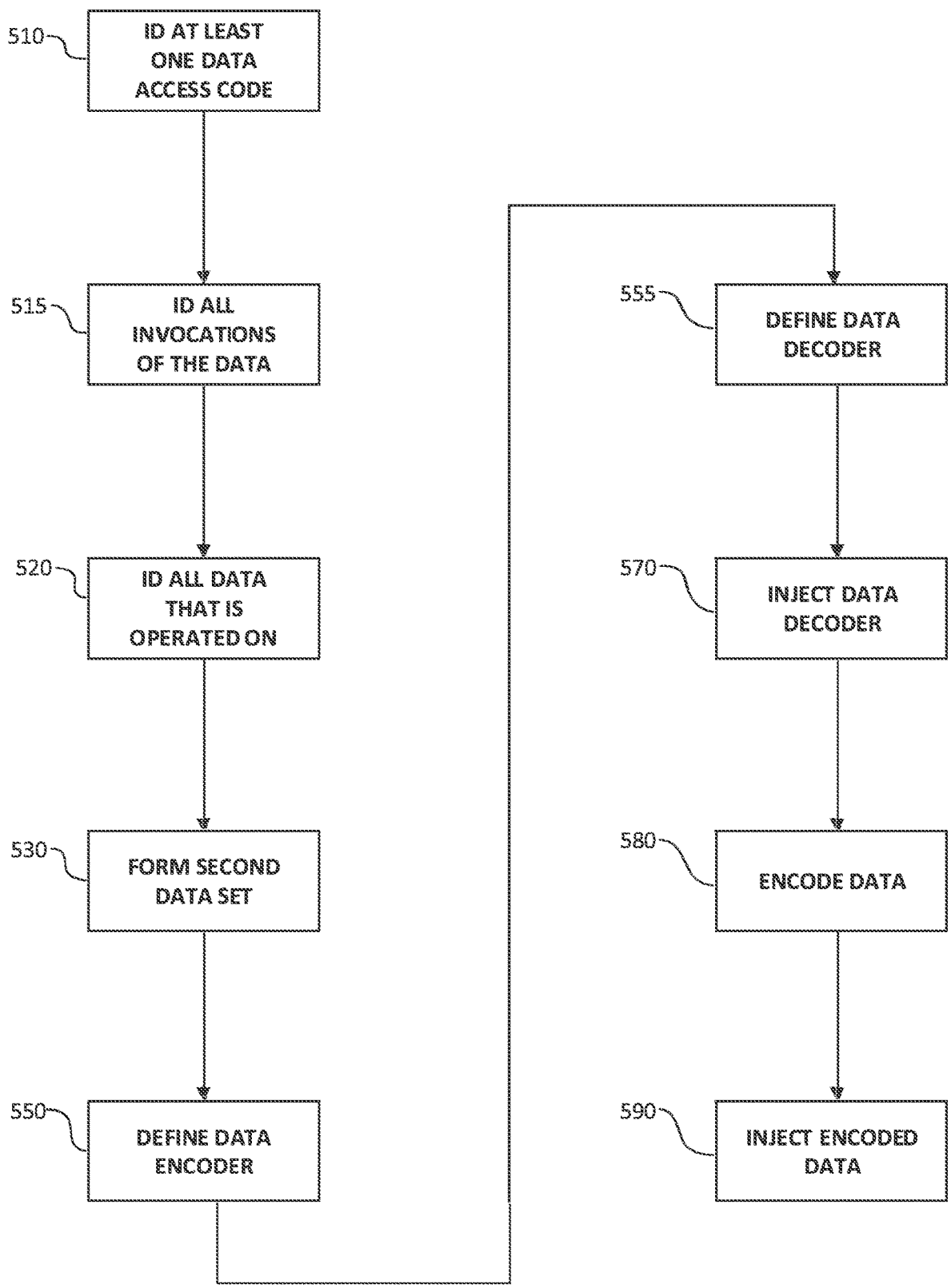
FIG. 5 is an example process of creating a secure computing program in accordance with embodiments of the technology disclosed herein.

FIG. 5 is a flowchart depicting an illustrative embodiment of a process 500 for converting the original program to the transformed program. Process 500 begins at 510 by identifying in the original program at least one operator or data access code on which the technology disclosed herein is to be practiced. At 515, the process identifies all instances in the original program where the operator(s) identified in 510 is/are invoked. At 520, the process identifies all data that serves as an operand (or argument) for the operator(s) identified in 515 as being invoked. This data constitutes a first data set.

Next, at 530, any data in the first data set that is also an operand (or argument) in the program for an operator that was not identified in 515 is withdrawn from the first data set to produce a second data set.

At 550, a data encoder instance is defined that converts original data to encoded data. Illustratively, the data encoder instance is defined as part of the function of encoder component 240. And at 555, a data decoder instance is defined that converts back to the original data encoded data produced by the encoder defined in 550. Illustratively, the data decoder instance is defined as part of the function of decoder component 250. Optionally, some of all of the data encoder instance may be a function of the data relocation component 260.

At step 570, the data decoder instance is injected into a data wrapper that is wrapped on the operator(s) identified in 515. Illustratively, this injection is performed by the data injection component 270. And at 580, the data (or operands or arguments) in the second data set are encoded using the data encoder defined in 550. Finally, at 590, the encoded operands are injected into the computer program in place of the original operands. Again, this injection is performed by the data injection component 270.

As a result of the operation of process 500, a secure computer program is created that comprises encoded data and data access codes where at least one of the data access codes is wrapped by a data decoder for decoding the encoded data and the encoded data and the wrapped data access codes are formed by process 500. Illustratively, the encoded program is stored in a non-transitory computer readable medium such as the memory of a computer or an embedded device.

Optionally, after completion of 590, process 500 may be repeated on the original program by identifying in 510 at least one additional operator or data access code in the original program that had not been identified previously and repeating the steps of process 500 set forth above. This may be done for each different operator or data access code. Advantageously, a different data encoding (and decoding) scheme may be defined for each iteration of process 500 so as to provide greater security for the transformed program.

As will be apparent to those skilled in the art, numerous variations may be practiced within the spirit and scope of the embodiments of the technology disclosed herein. For example, the order of some of the steps of FIG. 5 may be varied.

The secure obfuscation techniques discussed above with respect to FIGS. 1-5 may be performed at different times in accordance with the embodiments of the technology of the present disclosure. In some embodiments, the obfuscation may be performed statically at program and binary generation time, dynamically during operation of the program, or a combination of both. In various embodiments, the obfuscation is applicable to all forms of data, including strings or any other type of working memory on which a program operates on.

As discussed above with respect to FIG. 6, the VIMS 600 provides vulnerability detection and mitigation while embedded devices are in an online state 610 and an offline state 620.

Figure 8:
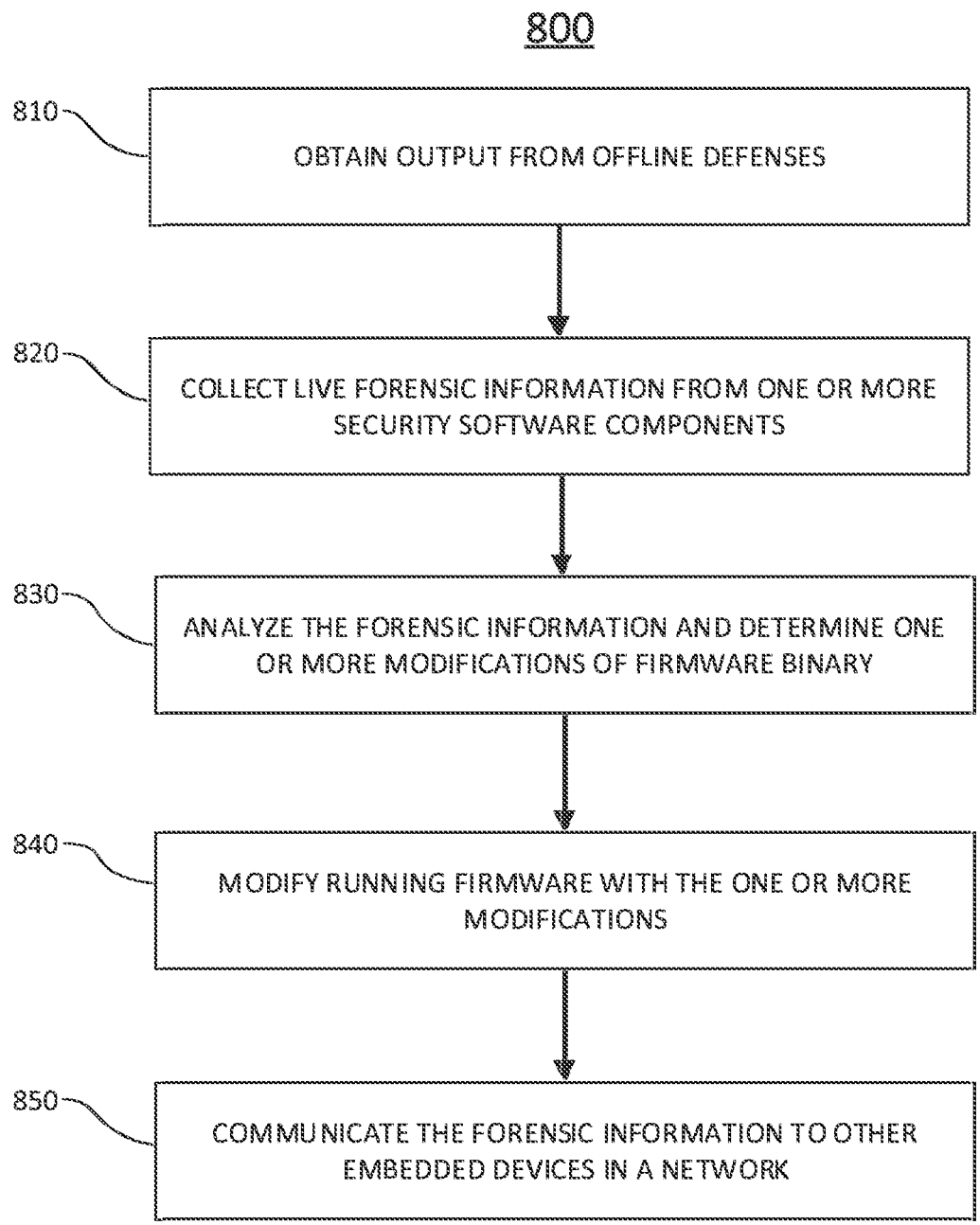
FIG. 8 is an example method of conducting dynamic vulnerability detection and mitigation in accordance with embodiments of the technology disclosed herein.

FIG. 8 illustrates an example online vulnerability detection and mitigation process 800 in accordance with embodiments of the technology disclosed herein. In various embodiments, the example online vulnerability detection and mitigation process 800 may be employed by the online defenses 612 discussed above with respect to FIG. 6.

At 810, the output from the offline defenses is obtained by a dynamic mitigation component. In some embodiments, the dynamic mitigation component may be similar to the dynamic mitigation component discussed above with respect to FIG. 6. In some embodiments, the offline defenses output may include a copy of the original firmware binary of the embedded device. Potential attacks and unauthorized changes may be identified based on the copy of the original firmware binary in some embodiments. In various embodiments, the offline defenses output may include patches and ABSR-relocated code. The copy of the original firmware, patches, and ABSR-relocated code may be utilized in repairing the running firmware.

At 820, the dynamic mitigation component may collect live forensic information from one or more security software components within the firmware binary. As discussed above with respect to FIGS. 6 and 7, the security software components enable online vulnerability detection and mitigation possible by providing information necessary to address exploitations. Mere detection of unauthorized modifications is insufficient to enable dynamic mitigation of exploited vulnerabilities because detection alone does not provide information like where the change occurred or what piece of firmware binary was exploited to enable the modification. In various embodiments, the security software components scan the embedded device and provide the forensic information for mitigation and detection of vulnerabilities, similar to the information identified by the security software components discussed above with respect to FIG. 6.

At 830, the dynamic mitigation component analyzes the forensic information and determines one or more modifications to make to the firmware binary in view of identified vulnerabilities. In some embodiments, the one or more modifications may be similar to the types of modifications discussed above with respect to the static mitigation injector engine of FIG. 7. In some embodiments, the dynamic mitigation component may determine that patching in the original firmware binary may be a modification to address one or more identified vulnerabilities. In other embodiments, the patch of original firmware binary may be conducted only at the site of the exploitation, instead of patching in the entire original firmware binary. In various embodiments, the dynamic mitigation component may identify one or more functions within the firmware binary that may be removed or deactivated without causing unintended consequences. Other embodiments may employ ABST to relocate firmware binary at the location of the unauthorized modification, replacing the binary with anything, which if modified, will allow the attacker to accomplish nothing. In At 840, the dynamic mitigation component modifies the running firmware with the one or more modifications. This modification may be similar to the live hardening 616 discussed with respect to FIG. 6.

At 850, the dynamic mitigation component may communicate the collected live forensic information from the security software components to other embedded devices within a network. By providing such information to other embedded devices within the network, mitigation strategies may be implemented within the other embedded devices before the vulnerability could be exploited.

Although discussed above with respect to example embodiments, nothing in the disclosure or the figures should be interpreted as limiting the scope of the technology disclosed herein.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 9:
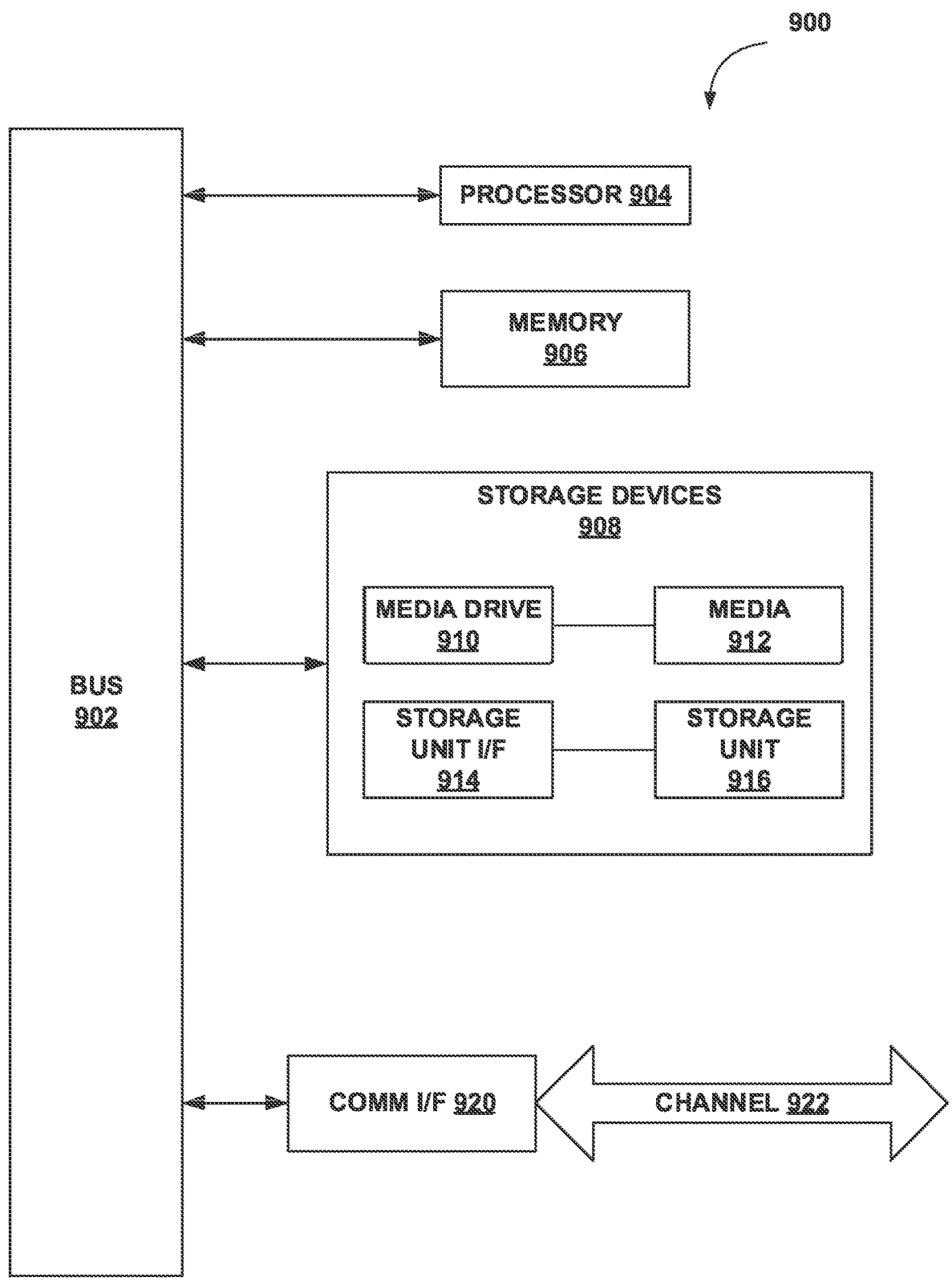
FIG. 9 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the technology using other computing components or architectures.

Referring now to FIG. 9, computing component 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 900 might include, for example, one or more processors, controllers, control components, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory components, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for securing computer code that includes a plurality of data access codes and a plurality of operands, said method comprising the steps of:
a) identifying a first data access code in a computer code;
b) identifying in the computer code one or more invocations of the first data access code;
c) identifying one or more operands from the one or more invocations of the first data access code, the one or more operands forming a first operand set;
d) determining a second operand set within the first operand set, the second operand set comprising one or more of the operands identified from the one or more invocations and being associated with at least one other data access code different than the first data access code;
e) forming a data encoder instance;
f) forming a data decoder instance;
g) injecting the data decoder instance into a data wrapper on the first data access code such that the data decoder instance is invoked prior to the first data access code during execution of the computer code;
h) encoding the second operand set using the data encoder instance to create an encoded operand set;
i) replacing the second operand set of the computer code with the encoded operand set;
j) identifying a second data access code in the computer code, wherein the second data access code is different from the first data access code;
k) generating secured computer code by repeating (b) through (i) for the second data access code; and
l) storing the secured computer code in a non-transitory computer readable medium;
wherein a data encoder instance associated with the first data access code encodes the second operand set associated with the first data access code using a first encoding scheme, a data encoder instance associated with the second data access code encodes the second operand set associated with the second data access code using a second encoding scheme, and the first encoding scheme is different from the second encoding scheme.

2. The method of claim 1, wherein:
each data encoder instance converts respective original data to respective encoded data; and
each data decoder instance converts the respective encoded data to the respective original data.

3. An embedded device comprising:
a hardware processor; and
a first non-transitory machine-readable storage medium encoded with instructions executable by the hardware processor to perform a method for securing computer code that includes a plurality of data access codes and a plurality of operands, said method comprising the steps of:
a) identifying a first data access code in a computer code;
b) identifying in the computer code one or more invocations of the first data access code;
c) identifying one or more operands from the one or more invocations of the first data access code, the one or more operands forming a first operand set;
d) determining a second operand set within the first operand set, the second operand set comprising one or more of the operands identified from the one or more invocations and being associated with at least one other data access code different than the first data access code;
e) forming a data encoder instance;
f) forming a data decoder instance;
g) injecting the data decoder instance into a data wrapper on the first data access code such that the data decoder instance is invoked prior to the first data access code during execution of the computer code;

h) encoding the second operand set using the data encoder instance to create an encoded operand set;

i) replacing the second operand set of the computer code with the encoded operand set;

j) identifying a second data access code in the computer code, wherein the second data access code is different from the first data access code;

k) generating secured computer code by repeating (b) through (i) for the second data access code; and l) storing the secured computer code in a second non-transitory computer readable medium;

wherein a data encoder instance associated with the first data access code encodes the second operand set associated with the first data access code using a first encoding scheme, a data encoder instance associated with the second data access code encodes the second operand set associated with the second data access code using a second encoding scheme, and the first encoding scheme is different from the second encoding scheme.

4. The embedded device of claim 3, wherein:

each data encoder instance converts respective original data to respective encoded data; and each data decoder instance converts the respective encoded data to the respective original data.

5. A first non-transitory machine-readable storage medium encoded with instructions executable by the hardware processor to perform a method for securing a secure computer program running in an embedded device, the secure computer program comprising:

first encoded data, and a plurality of data access codes, at least one data access code being wrapped by a data decoder for decoding the first encoded data;

the method comprising forming the first encoded data and the data access code that is wrapped by the data decoder by:

a) identifying a first data access code in the computer program;

b) identifying in the computer program all invocations of the data access code(s) identified in step (a);

c) identifying all data accessed by the data access code(s) identified as being invoked in step (b);

d) identifying all data in the computer program that is accessed by the data access code(s) identified in step (c) and not accessed by other data access codes in the computer program;

e) forming a data encoder instance that converts original data to encoded data;

f) forming a data decoder instance that converts the encoded data to the original data;

g) injecting the data decoder instance into a data wrapper on the data access code(s) identified in step (a) such that the data decoder instance is invoked prior to the data access code during execution of the computer program;

h) enrolling all data identified in step (d) using the data encoder instance;

i) injecting the data encoded in step (h) into the computer program in place of the data identified in step (d);

j) identifying a second data access code in the computer code, wherein the second data access code is different from the first data access code;

k) generating secured computer code by repeating (b) through (i) for the second data access code; and l) storing the secured computer code in a second non-transitory computer readable medium;

wherein a data encoder instance associated with the first data access code encodes the second operand set associated with the first data access code using a first encoding scheme, a data encoder instance associated with the second data access code encodes the second operand set associated with the second data access code using a second encoding scheme, and the first encoding scheme is different from the second encoding scheme.

6. The first non-transitory machine-readable storage medium of claim 5, wherein:

each data encoder instance converts respective original data to respective encoded data; and each data decoder instance converts the respective encoded data to the respective original data.

* * * * *